(12) United States Patent
Price

(10) Patent No.: US 12,049,191 B1
(45) Date of Patent: Jul. 30, 2024

(54) SECURE LOCKING HUB SYSTEM

(71) Applicant: Adam Price, Springfield, OH (US)

(72) Inventor: Adam Price, Springfield, OH (US)

(*) Notice: Subject to any disclaimer, the term of this patent is extended or adjusted under 35 U.S.C. 154(b) by 0 days.

(21) Appl. No.: 18/370,810

(22) Filed: Sep. 20, 2023

Related U.S. Application Data

(63) Continuation of application No. 17/151,590, filed on Jan. 18, 2021, now Pat. No. 11,801,804, which is a continuation-in-part of application No. 16/834,552, filed on Mar. 30, 2020, now Pat. No. 10,974,694, which is a continuation of application No. 15/902,448, filed on Feb. 22, 2018, now Pat. No. 10,640,083.

(51) Int. Cl.
*B60R 25/09* (2013.01)
*B60B 7/16* (2006.01)

(52) U.S. Cl.
CPC ............... *B60R 25/09* (2013.01); *B60B 7/16* (2013.01)

(58) Field of Classification Search
CPC .......... B60R 25/09; B60B 7/16; B60B 27/02; B60B 27/065; B60B 3/16; B60B 25/09; B62D 63/08; F16D 1/10; F16D 2001/103; Y10T 70/5836; Y10T 70/5841

USPC .... 70/225, 226, 237; 301/105.1, 35.58, 111, 301/114

See application file for complete search history.

(56) References Cited

U.S. PATENT DOCUMENTS

| | | |
|---|---|---|
| 5,520,272 A | 5/1996 | Ewer |
| 5,941,105 A | 8/1999 | Macey |
| 7,891,743 B2 | 2/2011 | Ballard |
| 9,382,951 B2 | 7/2016 | Reiner et al. |
| 10,639,931 B2 | 5/2020 | Price |
| 10,640,083 B2 | 5/2020 | Price |
| 10,974,694 B1 | 4/2021 | Price |
| 11,801,804 B1 * | 10/2023 | Price ...................... B60R 25/09 |
| 2013/0011215 A1 | 1/2013 | Wells |
| 2019/0031140 A1 | 1/2019 | Price |

* cited by examiner

*Primary Examiner* — Suzanne L Barrett
(74) *Attorney, Agent, or Firm* — AdamsIP, LLC; Stephen Thompson; J. Hunter Adams

(57) ABSTRACT

A locking hub system for locking a wheel hub of a vehicle to an axle is provided. The system has a locking ring that may be moved between locked and unlocked configurations. When in the locked configuration, the hub is in a rotationally fixed position relative to the axle on which the hub is mounted. With the hub locked to the axle, the wheel will not rotate and the vehicle thus cannot be moved. When in the unlocked configuration, the hub can rotate freely about the axle, thereby allowing movement of the vehicle.

20 Claims, 10 Drawing Sheets

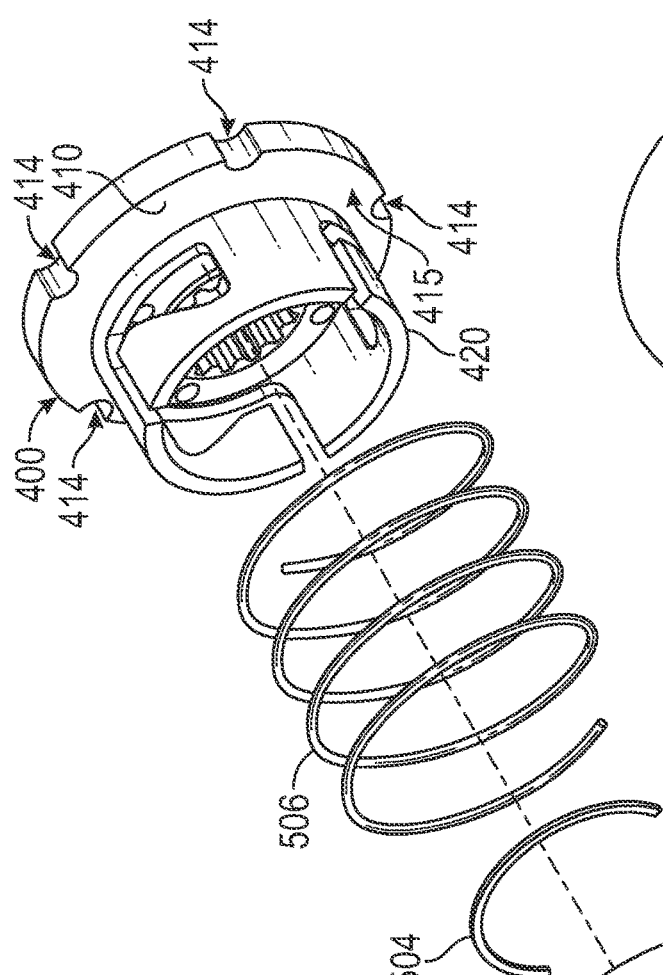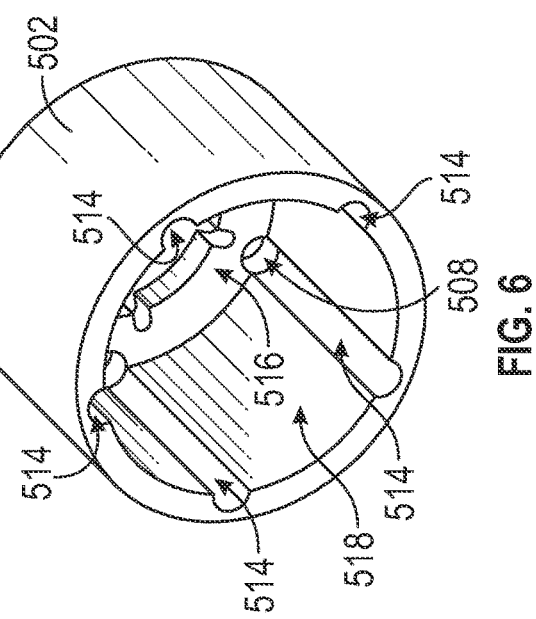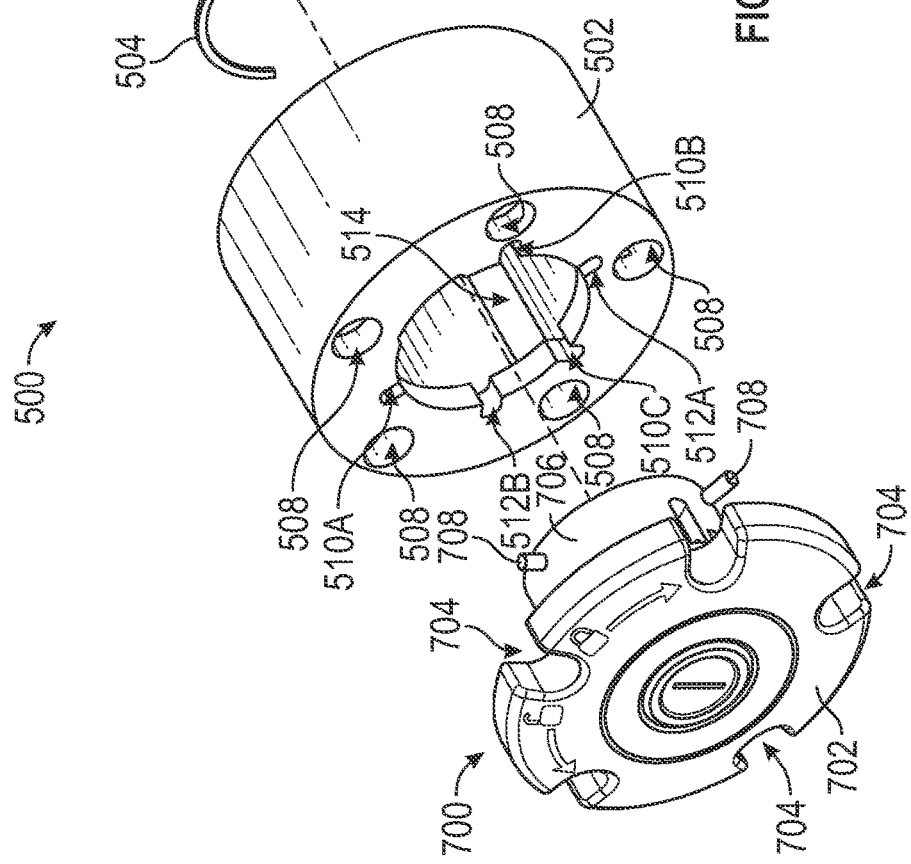
FIG. 5
FIG. 6

SECURE LOCKING HUB SYSTEM

CROSS REFERENCES

This application is a continuation of a co-pending U.S. patent application Ser. No. 17/151,590, filed on Jan. 18, 2021, which claims priority to U.S. patent application Ser. No. 16/834,552, filed on Mar. 30, 2020, now U.S. Pat. No. 10,974,694, which claims priority to U.S. patent application Ser. No. 15/902,448, filed on Feb. 22, 2018, now U.S. Pat. No. 10,640,083, in which all applications are incorporated herein in their entirety by reference.

FIELD OF THE INVENTION

The present invention relates generally to a locking hub system designed to prevent movement of a vehicle.

BACKGROUND

Trailers pulled by powered vehicles may be used to transport a variety of goods or materials, such as cargo, tools, equipment, vehicles, or livestock. Thus, many types of trailers have been designed for different purposes. These may include enclosed cargo trailers, flatbed trailers, boat trailers, vehicle trailers, livestock trailers, or dollies. Other types of trailers may be adapted to provide shelter, such as construction trailers or travel trailers. Trailers are typically attached to a powered vehicle using a hitch, which is used to tow the trailer behind the motor vehicle from location to location. The trailer may be detached from the vehicle by removing the trailer from the hitch.

Trailers are often a target of theft due to the value of the trailer itself as well as the value of items stored within the trailer. Hitch coupler locks are commonly used to prevent theft of trailers by securely latching a coupler onto a ball on the trailer hitch and locking the coupler into place. A coupler lock system locks a trailer to a vehicle hitch when the trailer is hitched to the vehicle and may also prevent an unhitched trailer from being hitched to a vehicle. However, hitch coupler lock systems generally use an exposed lock, such as a padlock, which may be cut by lock cutters or otherwise compromised in order to facilitate removing a hitched trailer from a vehicle and/or allowing an unhitched trailer to be hitched to a vehicle for the purpose of stealing the trailer. In addition, if the coupler or the latching mechanism of a coupler lock system fails, the locking system may be rendered inoperable. Further, coupler lock systems are used strictly for trailers having a coupler designed to be latched onto a ball hitch and thus cannot be used to prevent theft of a motorized vehicle, such as a car, motorcycle, recreational vehicle (RV), golf cart, electric conveyance vehicle (ECV), or similar types of vehicles.

Some attempts have been made to provide a security system for locking a vehicle wheel hub to prevent theft of the vehicle. In one known system, a keyed lock may be utilized to actuate a locking ring that locks a hub to an axle. The locking ring is operably connected to a cam attached to a lever that rotates in response to input from a key used to operate the lock. One potential problem with such a system is torque applied to the lock to actuate the locking ring, which may affect reliability of the system over an extended period of time.

Accordingly, a need exists in the art for an improved system for locking wheel hubs in order to prevent movement of various types of conveyance vehicles.

SUMMARY

In one aspect, a secure locking hub system for locking a wheel hub of a conveyance vehicle to an axle is provided. The system locks a wheel hub in a rotationally fixed position relative to the axle and has security features designed to prevent unauthorized unlocking of the hub. Securely locking the wheel in a rotationally fixed position prevents theft of the vehicle by preventing the vehicle from being moved by an unauthorized person through normal operation of the vehicle. The locking hub system may be installed on an axle of a motorized or non-motorized vehicle and is preferably installed on an axle that is mounted on the vehicle in a rotationally fixed position. Multiple locking hub systems may be installed on one or more individual wheels of the vehicle, respectively, to provide greater security.

The system includes a hub that may be rotatably coupled to an axle with a wheel mounted on the hub. The system is designed to be switched between a locked configuration and an unlocked configuration. When in the locked configuration, the hub and the wheel mounted thereon will not rotate on the axle. With at least one wheel hub of a conveyance vehicle in a rotationally locked position relative to the axle, the vehicle cannot move through normal rotation of the wheel. When in the unlocked configuration, the hub and wheel mounted thereon may freely rotate so that the vehicle may be operated in a normal manner. A security lock secures the locking hub system in the locked configuration in order to prevent any unauthorized individual from switching the system into the unlocked configuration. Thus, the security lock prevents unauthorized movement of the vehicle and thus prevents theft.

The locking hub system comprises a hub coupled to an axle, a locking ring configured to mate with the axle in a locked configuration and to decouple from the axle in an unlocked configuration, an actuator operably connected to the locking ring and configured to move the locking ring in an axial direction between the locked configuration and the unlocked configuration, and a lock configured to selectively limit operation of the actuator. The hub is rotationally fixed relative to the axle in the locked configuration and free to rotate about the axle in the unlocked configuration. The locking ring moves back and forth in an axial direction to mate with the axle and to decouple from the axle. In a preferred embodiment, the actuator is a mechanical actuator comprising a dial operably connected to the locking ring and configured to move the locking ring in an axial direction between the locked configuration and the unlocked configuration in response to rotational movement of the dial. In this embodiment, the lock is configured to selectively limit rotational movement of the dial. Thus, the dial may be locked in place when the locking ring is either in the locked configuration or the unlocked configuration. The dial may be unlocked to rotate the dial in order to switch the locking ring between the locked and unlocked configurations.

The dial may be secured to a housing that is fastened to the hub with bolts, which preferably each have a tamper-proof bolt head. In a preferred embodiment, the dial is configured to cover the head of each bolt when the locking ring is in the locked configuration so that the bolts cannot be accessed from the exterior of the wheel hub. This feature prevents an unauthorized person from circumventing the security features of the locking hub system by disassembling the wheel hub. Thus, an unauthorized user not in possession of a key to the lock will not be able to unlock the hub and thus will be unable to move the vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DESCRIPTION OF THE DRAWINGS

These and other features, aspects, and advantages of the present invention will become better understood with regard to the following description, appended claims, and accompanying drawings where:

FIG. 5 shows an exploded view of an actuator assembly for a locking hub system in accordance with the present disclosure.

FIG. 6 shows a perspective view of a component of the actuator assembly shown in FIG. 5.

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

As used herein, the term "conveyance vehicle" may refer to any type of motorized or non-motorized vehicle having wheels that may be used for transporting people or goods. A conveyance vehicle may include, but is not limited to, non-motorized vehicles such as a trailer, which may include enclosed cargo trailers, flatbed trailers, boat trailers, vehicle trailers, livestock trailers, or dollies, other non-motorized vehicles such as a wagon or bicycle, and motorized vehicles such as a car, motorcycle, recreational vehicle (RV), motor home, golf cart, electric conveyance vehicle (ECV), or scooter. As used herein, the term "axle" refers to any component of a conveyance vehicle that provides a structure for rotatably coupling a wheel hub thereto. As used herein, the terms "locked configuration" and "unlocked configuration" refer to the relative positioning of a locking ring to the axle.

Figure 1:
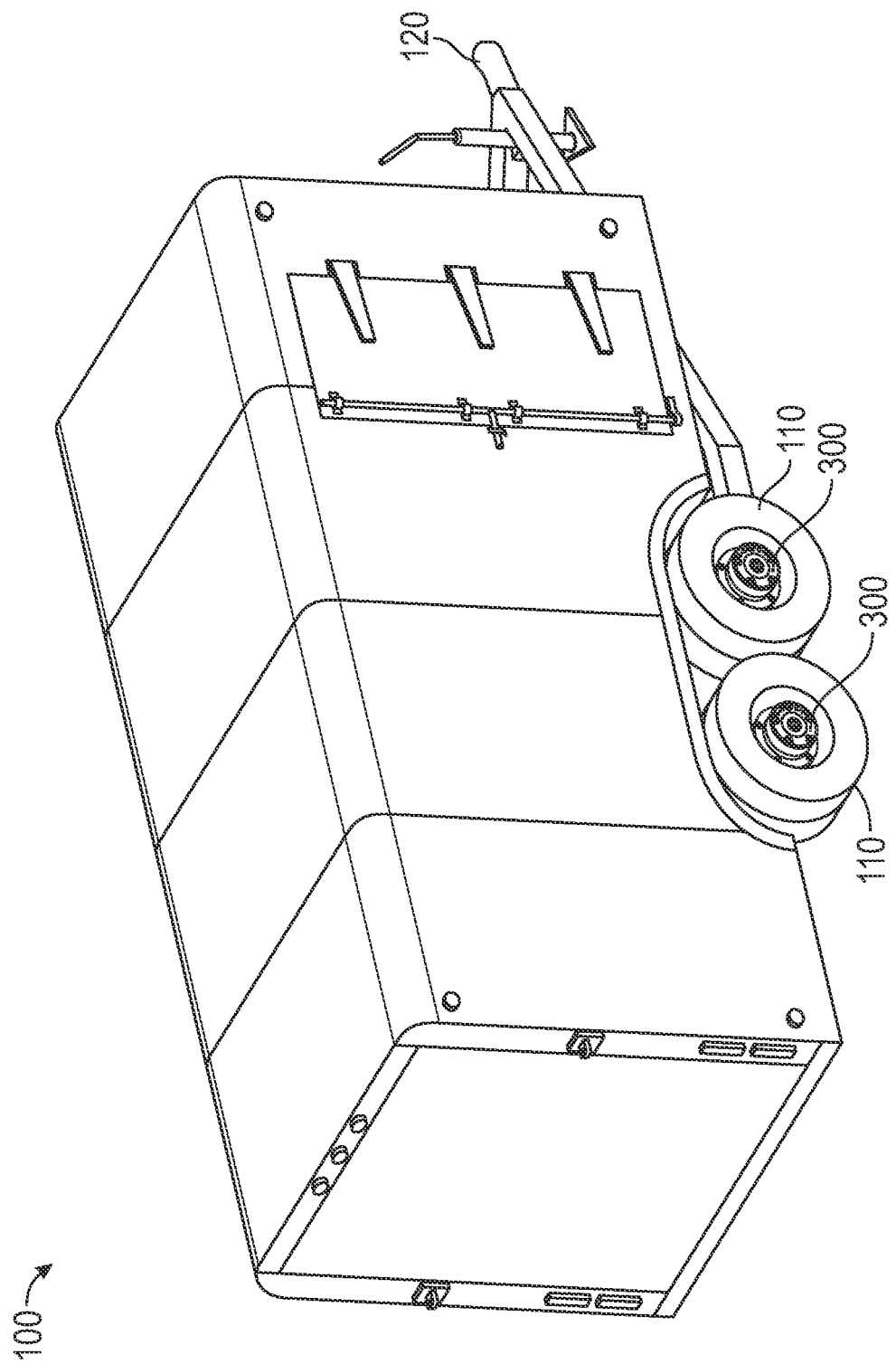
FIG. 1 shows a perspective view of a conveyance vehicle including a locking hub system for locking and unlocking a wheel hub to an axle in accordance with the present disclosure.

Turning now to the drawings, FIG. 1 shows an enclosed cargo trailer 100, which is one example of a conveyance vehicle on which a locking hub system may be installed. The trailer 100 has two wheels 110 on each side with each wheel having a locking hub system 300 for locking the wheel. Each wheel 110 is mounted on a hub 212 that is rotatably coupled to and positioned around an axle 202, of which an end portion can be seen in FIGS. 2 and 3. The trailer 100 has a coupler 120 for hitching the trailer to a trailer hitch ball attached to a motorized vehicle for hauling the trailer. The trailer axle 202 is mounted in a rotationally fixed position and thus does not rotate when the vehicle 100 is in motion. The hub 212 supporting the wheel 110 is coupled to the axle 202 and is supported by bearings so that the hub 212 and wheel 110 may rotate about the axle while the axle 202 remains in a fixed position. The trailer 100 shown in FIG. 1 may have a single axle that supports a set of two opposing wheels, or may have individual axles that support each individual wheel 110.

Figure 3:
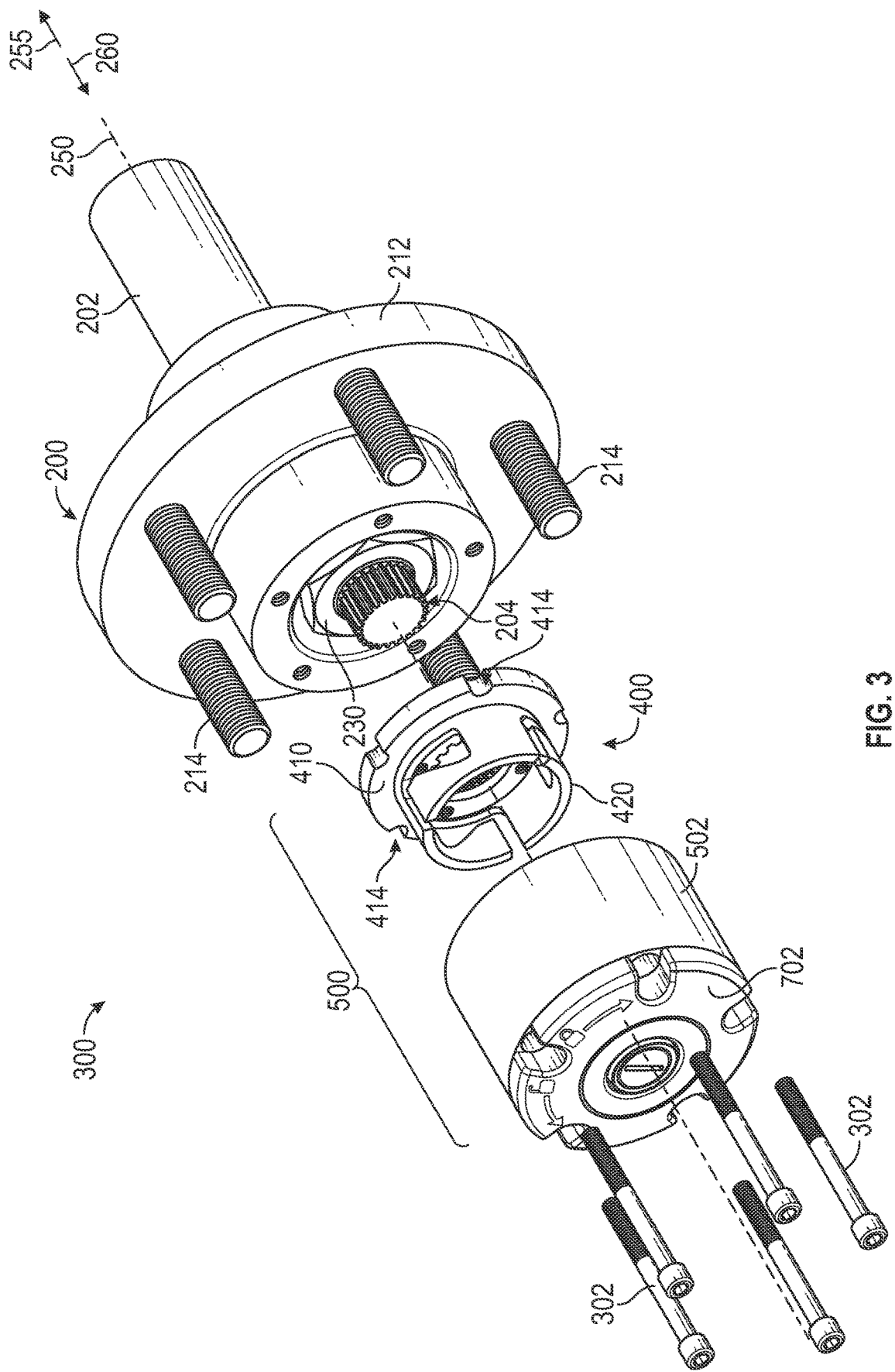
FIG. 3 shows an exploded view of a locking hub system in accordance with the present disclosure.

FIG. 3 shows an exploded view of an illustrative locking hub system 300 that may be used to lock the wheel 110 of the trailer 100 shown in FIG. 1 in a rotationally fixed position relative to the axle 202. The system 300 has security features designed to prevent unauthorized unlocking of the wheel hub 212 and thus prevent theft of the vehicle 100 by preventing the vehicle from being moved by an unauthorized person through normal operation of the vehicle. To prevent theft, the secure locking hub system 300 should be installed on a fixed axle (i.e., an axle that does not rotate), which generally includes axles of non-motorized vehicles. On motorized vehicles, at least one axle rotates to drive the motion of the vehicle, but the system 300 may be installed on a non-rotating axle to prevent theft of the vehicle. Multiple locking hub systems 300 may be installed on one or more individual wheels 110 of the vehicle, respectively, to provide greater security.

The system 300 is designed to be switched between a locked configuration and an unlocked configuration. When in the locked configuration, the hub 212 and the wheel mounted thereon are locked such that the hub and wheel will not rotate on the axle 202. With at least one wheel hub 212 of a conveyance vehicle 100 in a rotationally locked position relative to the axle 202, the vehicle cannot move by normal rotation of the wheel 110. When in the unlocked configuration, the hub 212 and wheel mounted thereon may rotate freely so that the vehicle 100 may be operated in a normal manner. A security lock 720 secures the locking hub system 300 in the locked configuration in order to prevent any unauthorized individual from switching the system into the unlocked configuration. Thus, the security lock prevents unauthorized movement of the vehicle. A key configured to operate the lock 720 may be used by an authorized individual to switch the system between the locked and unlocked configurations.

Figure 2:
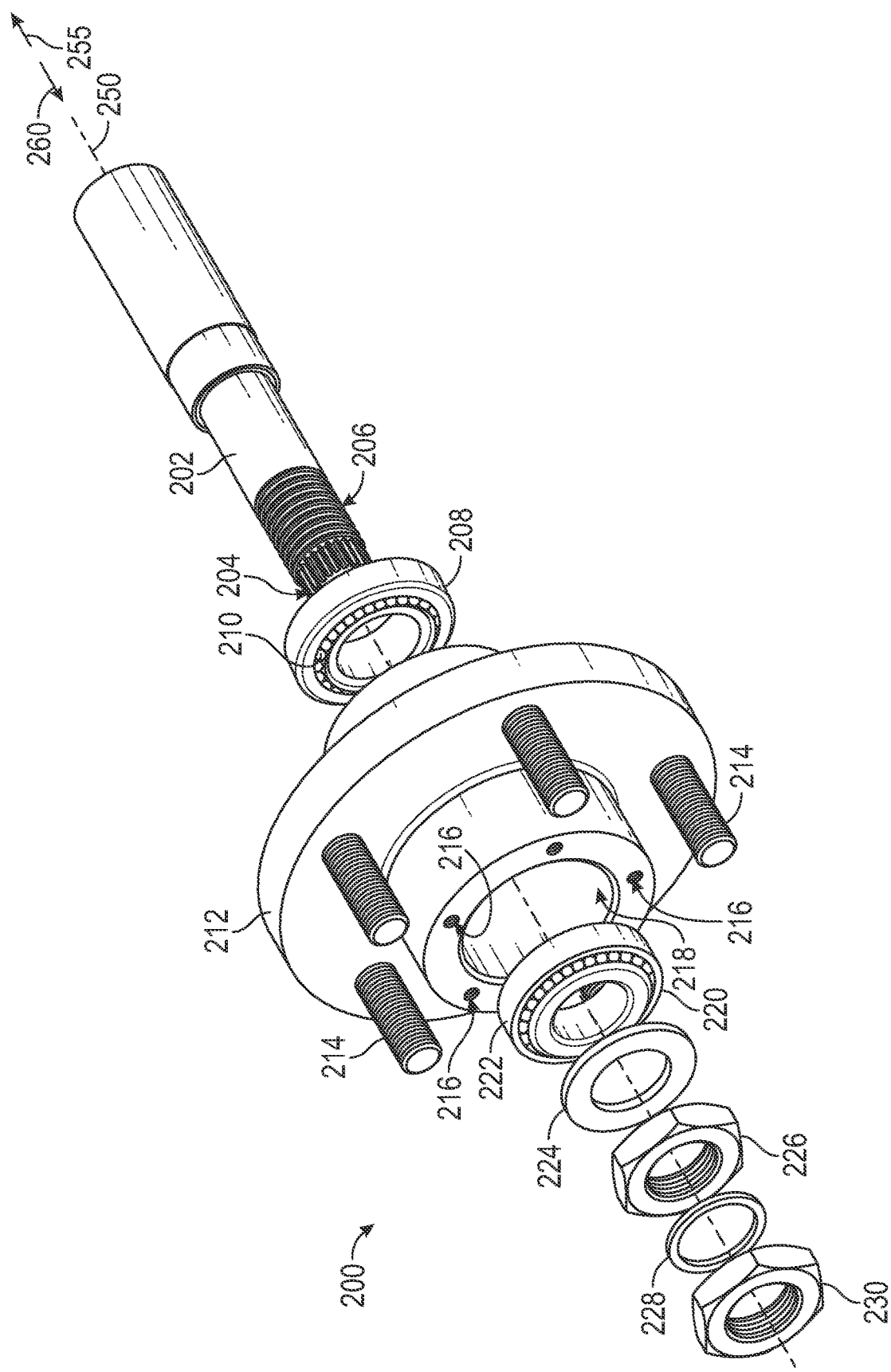
FIG. 2 shows an exploded view of a modified hub assembly for use in a locking hub system in accordance with the present disclosure.
Figure 8:
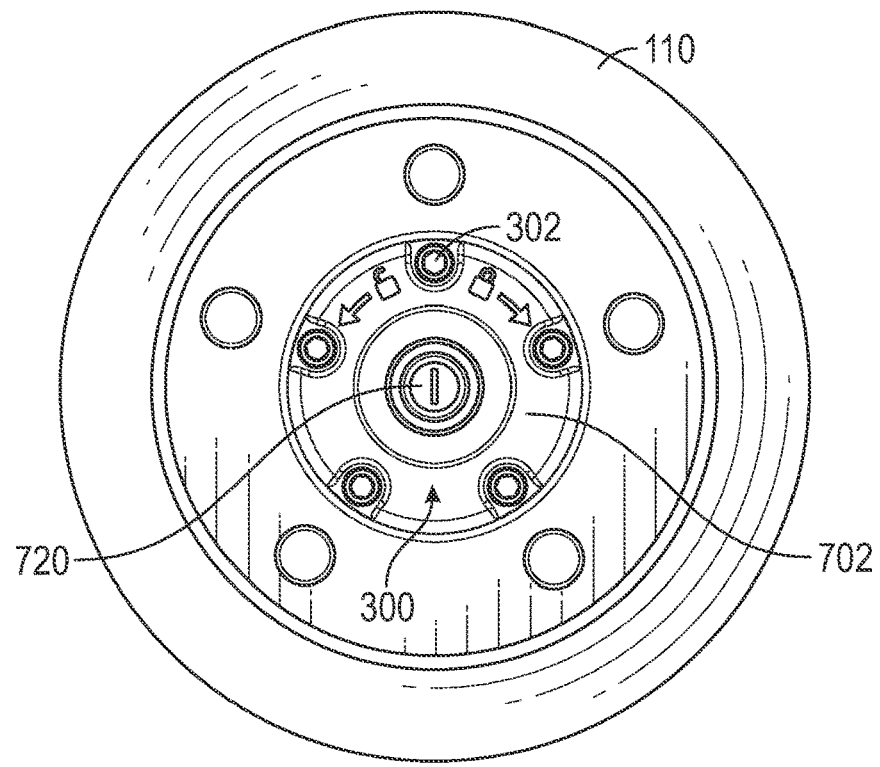
FIG. 8 shows a front elevational view of a locking hub system with a wheel mounted thereon in accordance with the present disclosure.

FIG. 2 shows an exploded view of a hub assembly 200 that may be utilized with the locking hub system 300. The hub assembly 200 comprises a hub 212 rotatably coupled to and positioned around an axle 202. The hub 212 rotates about a central axis 250 when the vehicle 100 is in motion so that a wheel 110 mounted on the hub rotates with the hub. As used herein, an inward direction refers to a direction extending toward the axle 202, and an outward direction refers to a direction extending away from the axle 202 toward a dial 702 that is accessible from the exterior of the wheel 110, as shown in FIG. 8. Arrow 255 indicates an inward direction, and arrow 260 indicates an outward direction.

The hub 212 is supported on the axle 202 by at least one bearing so that the hub 212 and wheel 110 may rotate about the axle 202. Preferably, as shown in FIG. 2, the hub assembly 200 comprises an inner bearing 208 having a series of rollers 210 and an outer bearing 220 also having a series of rollers 222. An outer surface of each bearing 208 and 220 may function as a race that, when installed in the hub 212, is in face sharing contact with an inner surface of the hub 212 so that the outer surface of each bearing 208 and 220 rotates with the hub 212 on rollers 210 and 222. Other suitable types of bearings may be utilized for rotatably coupling the hub 212 to the axle 202. The hub 212 has outwardly facing bolts 214 for mounting a wheel 110 on the hub 212.

To install the hub assembly 200 for use in the locking hub system 300, the inner bearing 208 and outer bearing 220 may be installed within the hub 212. The hub 212 may then be installed around the axle 202 through a central opening 218 of the hub 212 so that an inner surface of each bearing 208 and 220 are in face sharing contact with a smooth surface portion of the axle 202. A bearing seal may be utilized to prevent grease from leaking out and water from getting into the hub 212 after installation. The hub 212 may then be secured to the axle 202 with a fastener. Preferably, as shown in FIG. 2, a thrust washer 224 is installed between the outer bearing 220 and a hub nut 226 that secures the hub 212 and bearings 208 and 220 on the axle 202. The hub nut 226 is threaded onto a male threaded section 206 of the axle 202. A second washer 228 and a second nut 230 may be utilized to ensure that the hub nut 226 does not become loose during use of the hub assembly 200. The bearings 208 and 220 support the hub 212 on the axle 202, and the fasteners 226 and 230 secure the assembly to the axle 202.

The axle 202 is configured to mate with a locking ring 410 that locks the hub 212 in a rotationally fixed position relative to the axle 202, which is the locked configuration. Preferably, the axle 202 has a section of splines 204 disposed around a circumference of the axle 202 that are configured to mate with splines 412 on the locking ring 410. The axle splines 204 are preferably positioned in an outward position relative to the threads 206 of the axle 202. FIG. 3 shows the hub assembly 200 in an assembled state. As shown in FIG. 3, when assembled the axle splines 204 extend in an outward direction from the most outwardly positioned nut 230 used to secure the hub 212 and bearings 208 and 220 onto the axle. The outwardly extending axle splines 204 provide surface area for the locking ring splines 412 to engage.

Figure 4:
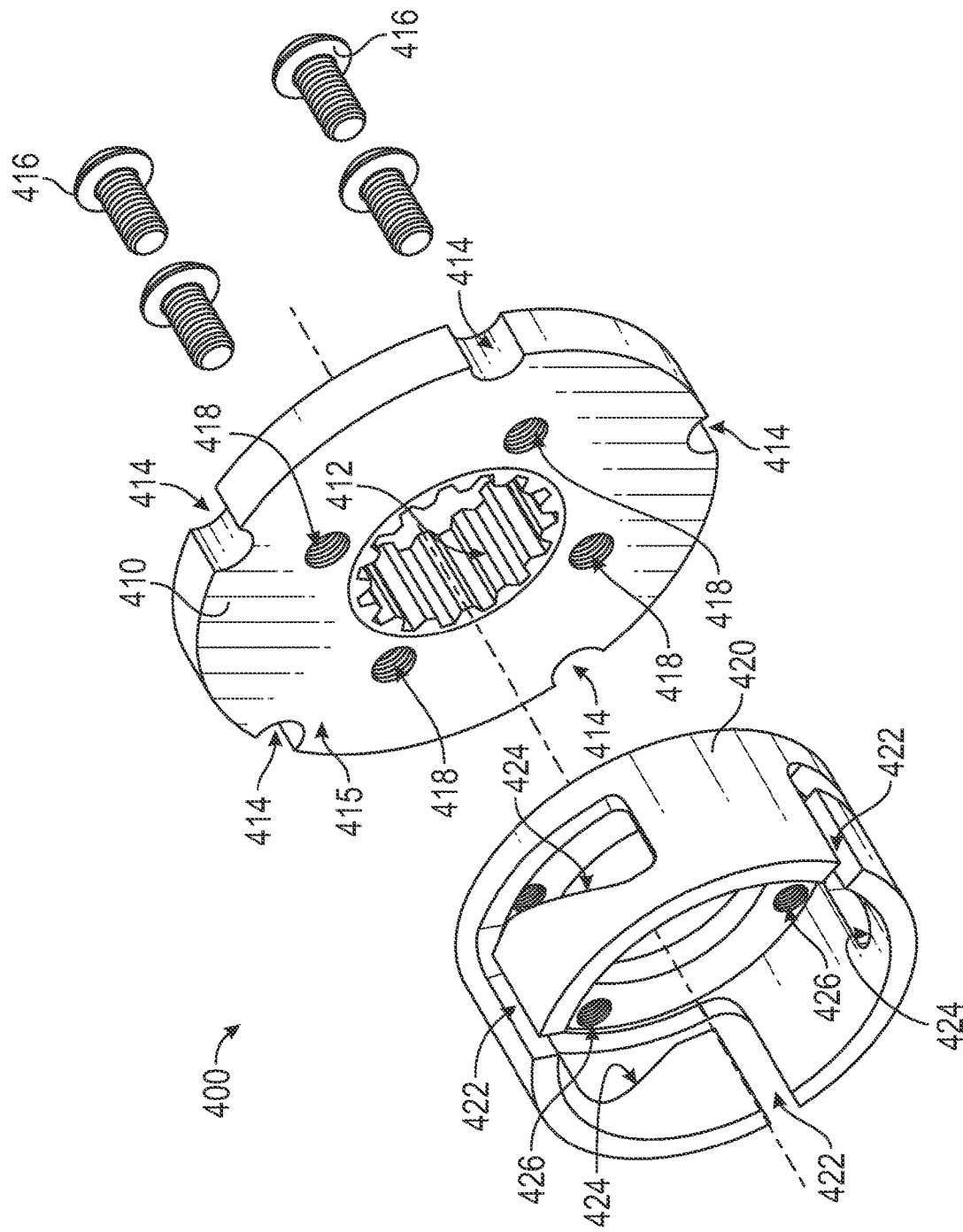
FIG. 4 shows an exploded view of a locking ring assembly for a locking hub system in accordance with the present disclosure.
Figure 12:
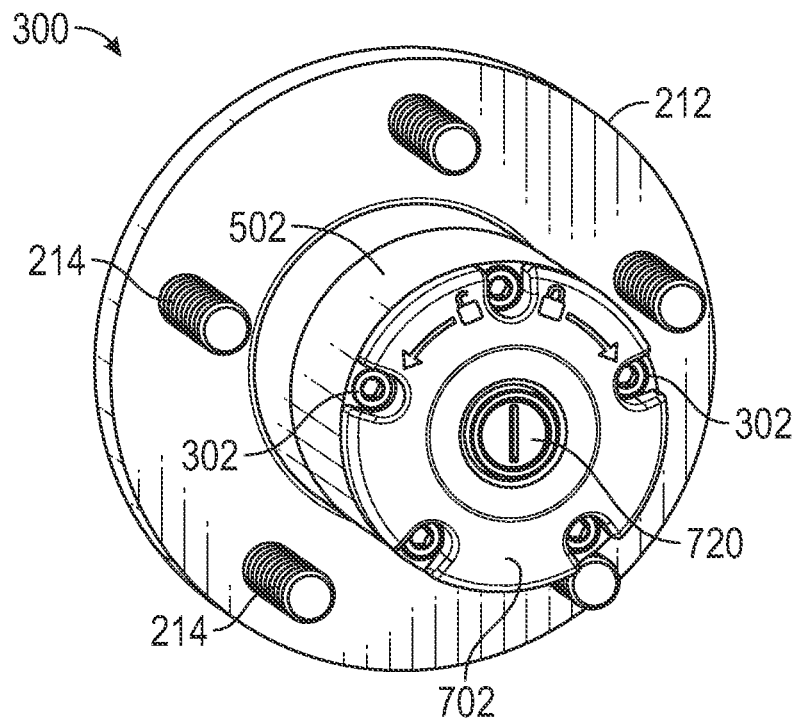
FIG. 12 shows a perspective view of an assembled locking hub system with a dial in an unlocked position in accordance with the present disclosure.
Figure 13:
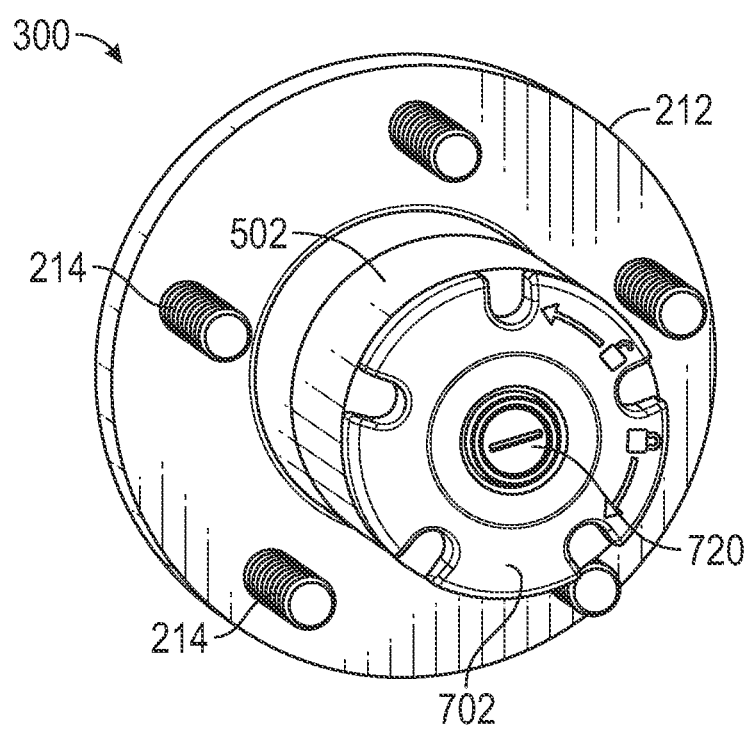
FIG. 13 shows a perspective view of an assembled locking hub system with the dial in a locked position in accordance with the present disclosure.

FIG. 3 shows an exploded view of the secure locking hub system 300, which includes the hub assembly 200 and an actuator assembly 500, which includes a locking ring assembly 400. FIG. 5 shows the actuator assembly 500, and FIG. 4 shows the locking ring assembly 400. The actuator assembly 500 includes the locking ring assembly 400, a cap assembly 700, a housing 502, a coil spring 506, and a retaining clip 504. When the actuator assembly 500 is in an assembled state, the locking ring assembly 400 is disposed within the housing 502, and the locking ring 410 is resiliently biased in an inward direction 255 by the spring 506. The assembled actuator assembly 500 may be secured to the hub 212 utilizing bolts 302 to complete assembly of the locking hub system 300, as shown in FIGS. 12 and 13.

As shown in FIG. 4, in a preferred embodiment, the locking ring assembly 400 comprises a locking ring 410 and a cam 420. The locking ring 410 moves back and forth in an axial direction between the locked and unlocked configurations. The locking ring 410 is configured to mate with the axle 202 in the locked configuration and to decouple from the axle 202 in the unlocked configuration. The locking ring 410 moves in an inward direction 255 to mate with the axle 202 and in an outward direction 260 to decouple from the axle 202. The hub 212 is rotationally fixed relative to the axle 202 in the locked configuration and free to rotate about the axle 202 in the unlocked configuration. In a preferred embodiment, as shown in FIG. 4, the locking ring 410 has an interior splined surface 412 configured to mate with an exterior splined surface 204 positioned around a circumference of the axle 202. The locking ring 410 has grooves 414 positioned around an outer edge of the ring 410 that correspond to each of the bolts 302, respectively, that fasten the actuator assembly 500 to the hub 212. When assembled, a fastening bolt 302 fits within each groove 414 of the locking ring 410 to prevent rotation of the ring. The locking ring 410 may be secured to the cam 420 with threaded fasteners 416 screwed into threaded holes 418 in the locking ring 410 and threaded holes 426 in the cam 420. The cam 420 has ramped surfaces 424 that engage with pins 708 of the cap assembly 700.

The locking hub system 300 further comprises an actuator operably connected to the locking ring 410 and configured to move the locking ring 410 in an axial direction between the locked configuration and the unlocked configuration. The system 300 also comprises a lock configured to selectively limit operation of the actuator. The actuator may be any suitable type of actuator that allows an authorized user to actuate axial movement of the locking ring from the exterior of a wheel hub in order to lock the hub to an axle and unlock the hub from the axle. In a preferred embodiment, the actuator is a mechanical actuator comprising a dial 702 operably connected to the locking ring 410 and configured to move the locking ring 410 in an axial direction between the locked configuration and the unlocked configuration in response to rotational movement of the dial 702. In this embodiment, the lock 720 is configured to selectively limit rotational movement of the dial 702.

Figure 7:
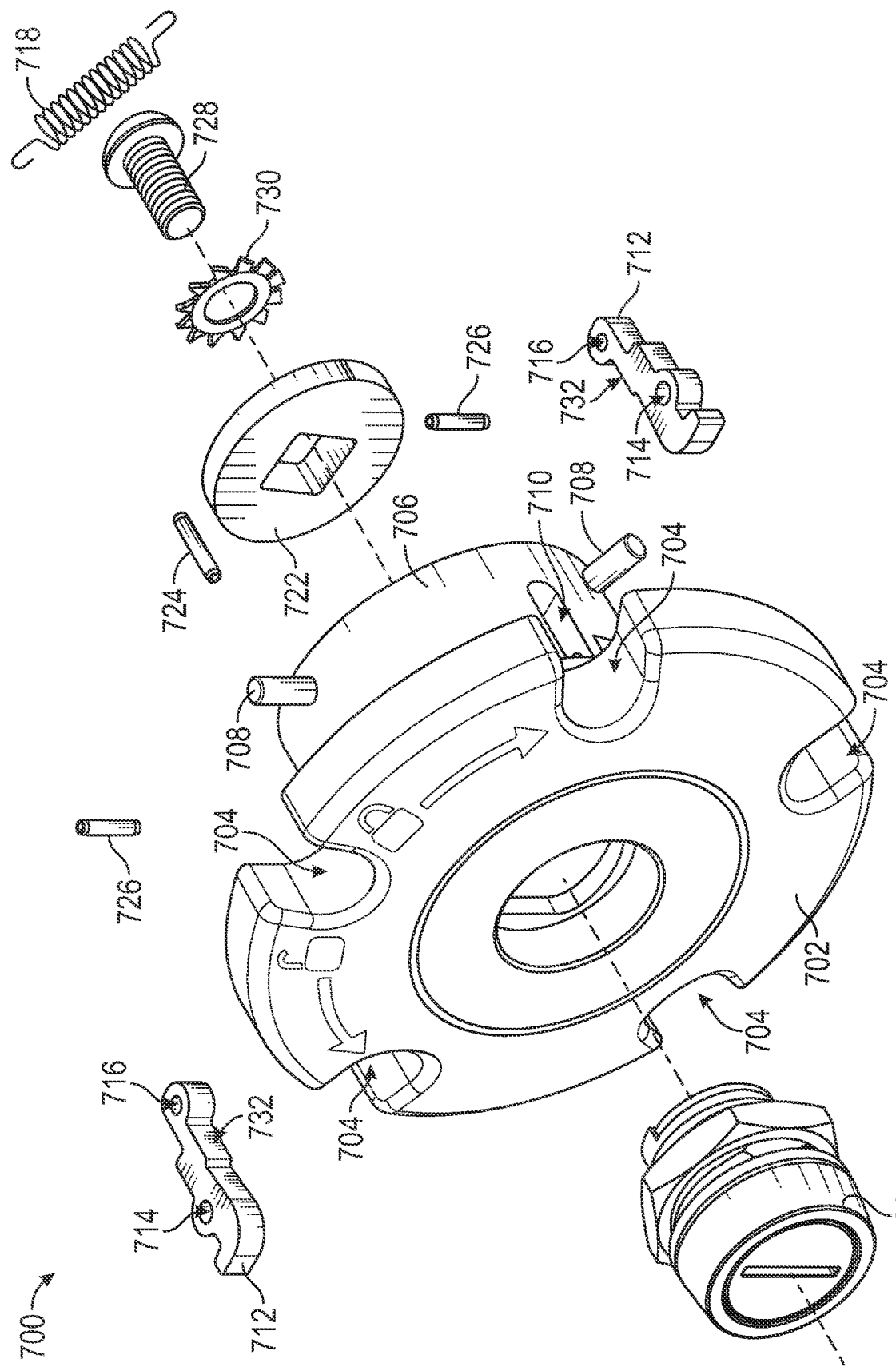
FIG. 7 shows an exploded view of a cap assembly for a locking hub system in accordance with the present disclosure.

FIG. 7 illustrates an exploded view of an example cap assembly 700, which includes a dial 702 and functions as the actuator, and FIG. 5 shows the cap assembly 700 in an assembled state. The dial 702 has an actuating extension 706, which has attached pins 708 extending radially outward. The pins 708 engage with ramped surfaces 424 of the cam 420 to move the locking ring 410 in an axial direction. The actuating extension 706 preferably has three pins 708 spaced equidistantly around a perimeter of the extension (two of the three pins 708 are visible in FIGS. 5 and 7). The dial 702 may be rotated in one direction to move the locking ring 410 into the locked configuration, in which it is mated with the axle 202, and in an opposite direction to move the locking ring 410 into the unlocked configuration, in which it is decoupled from the axle 202. For example, as indicated by the arrows displayed on the dial 702 in FIG. 7, rotating the dial clockwise locks the hub to the axle, and rotating the dial counterclockwise unlocks the hub from the axle.

Figure 10:
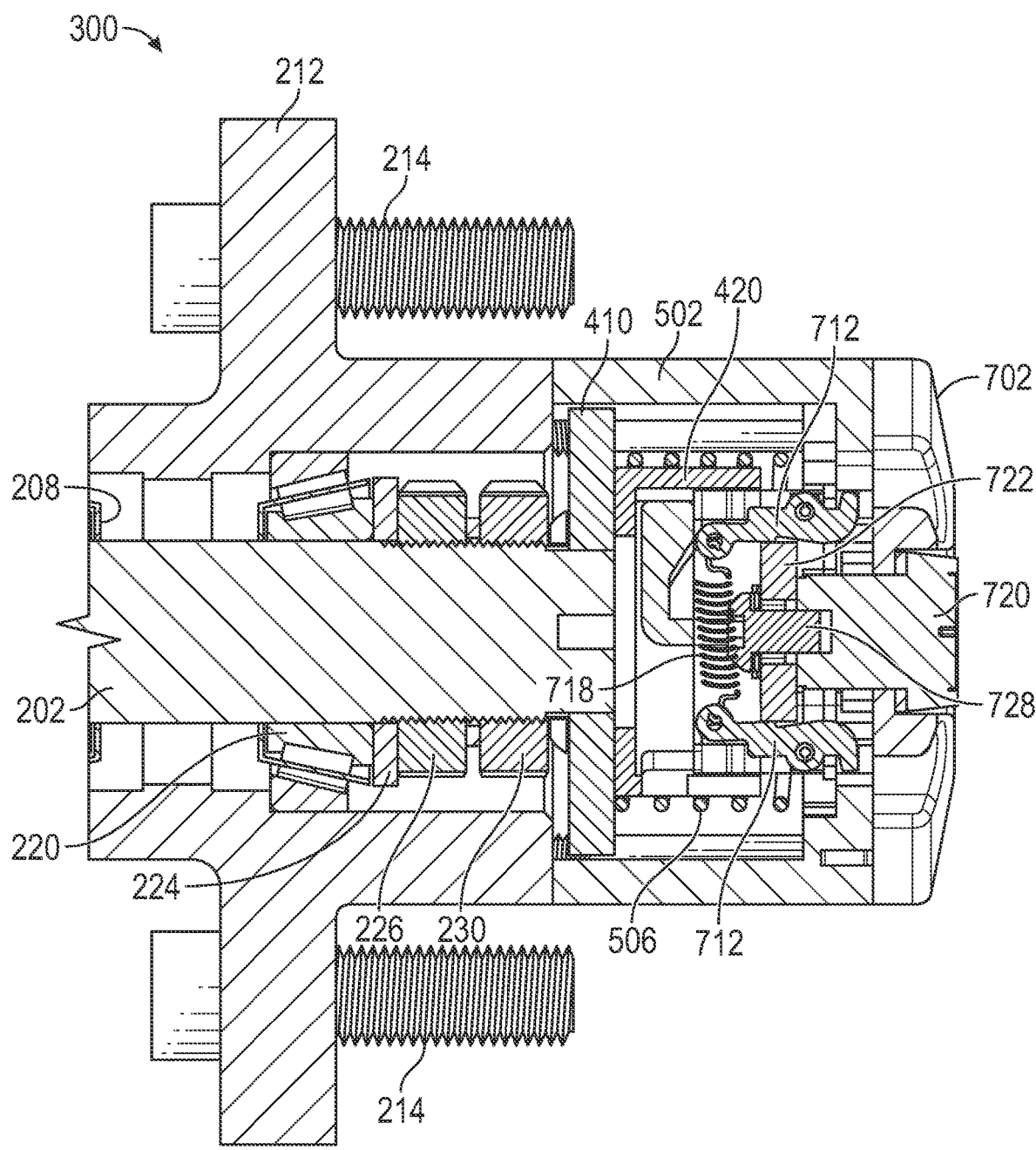
FIG. 10 shows a cross-sectional view of the assembled locking hub system shown in FIG. 9 with the locking ring in the locked configuration and with the cross-sectional plane in line with two opposing lock pawls.
Figure 11:
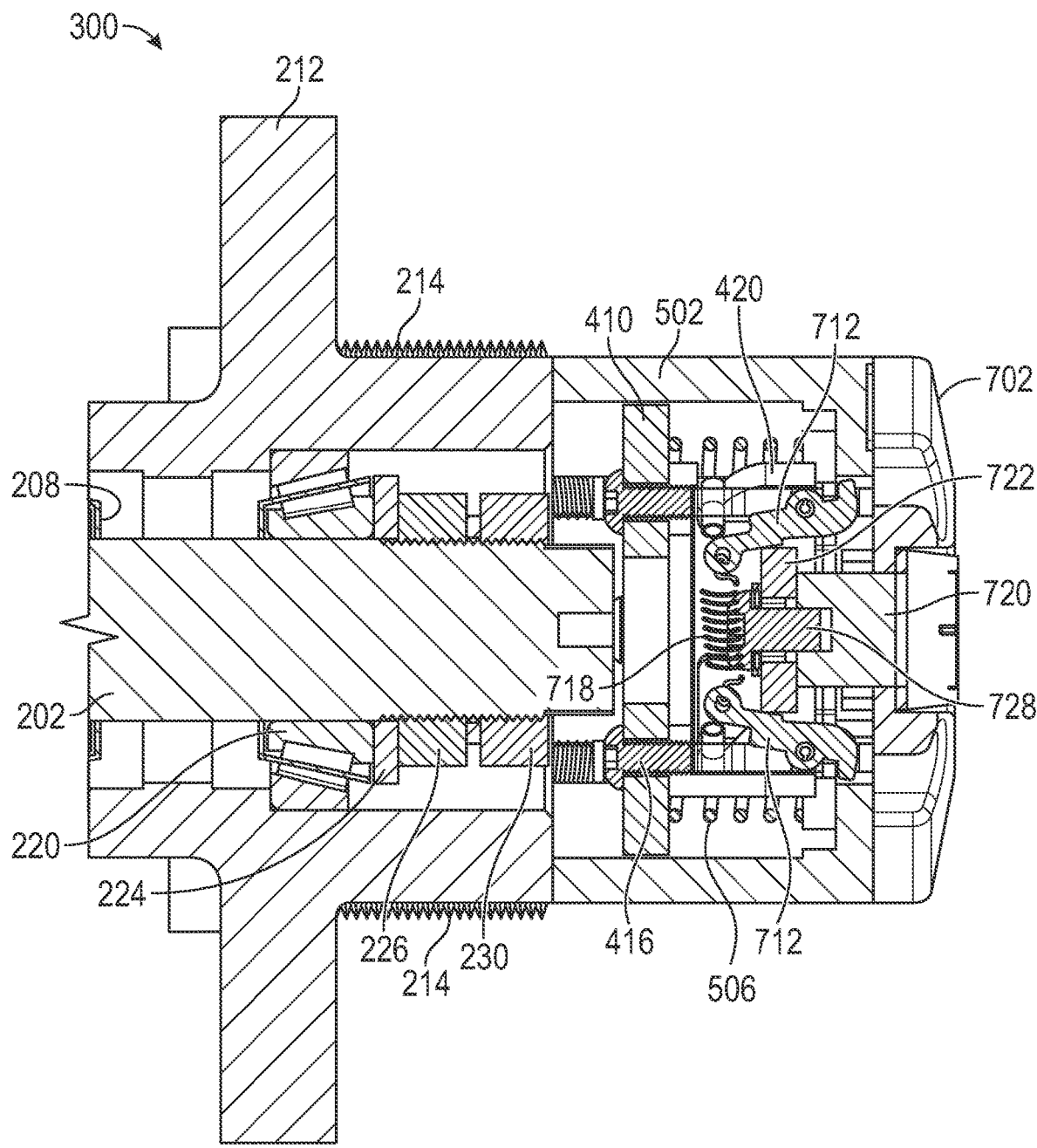
FIG. 11 shows a cross-sectional view of the assembled locking hub system shown in FIG. 9 with the locking ring in the unlocked configuration and with the cross-sectional plane rotated from the plane shown in FIG. 10 to remain in line with the opposing lock pawls.

The cap assembly 700 provides an exterior cover for the locking hub system 300 with an externally accessible dial 702 and security lock 720, which may be operated by a unique key for locking and unlocking the lock 720. The lock 720 is preferably a cam lock having a rotating cam 722. The lock 720 is secured to the dial 702 such that only an external face of the lock 720 with a keyhole therein is accessible, as shown in FIGS. 12 and 13. The lock 720 is preferably permanently attached to the dial 702 so that the lock cannot be tampered with or otherwise compromised. The rotating lock cam 722 may be secured to the lock 720 with a cam screw 728 and lock washer 730. The lock cam 722 rotates in response to input from a key configured to operate the lock. A rotation limit pin 724 limits clockwise and counterclockwise rotation of the cam 722. The assembly 700 further comprises opposing lock pawls 712 that lock the dial 702 in a fixed position. The actuating extension 706 has two opposing lock pawl openings 710 (only one is visible in FIG. 7) in which each lock pawl 712 is installed. A pivot pin 726 is disposed within an opening 714 in each lock pawl 712 and secured to the actuating extension 706 so that the pawls 712 are each positioned within a pawl opening 710. Each lock pawl 712 may rotate about the pivot pin 726. Each end of a spring 718 is secured to a second opening 716 in each respective pawl 712, as shown in FIGS. 10 and 11. The spring 718 pulls the ends of the pawls 712 to which the spring is secured toward each other. Due to the pivoting motion about the pivot pins 726, an opposite end of each pawl 712 is thus resiliently biased in a radially outward direction from axis 250. FIG. 11 illustrates the pawls 712 in this position. The rotating cam 722 is configured so that it contacts a surface area 732 of each pawl 712, as shown in FIGS. 10 and 11. When the cam 722 rotates in response to input from a key to unlock the lock 720, it forces the end of each pawl 712 to which the spring is secured to move in a radially outward direction against the force of the spring, thereby causing the opposite end of each pawl to move in a radially inward direction. FIG. 10 illustrates the pawls 712 in this position. Rotating the cam 722 in an opposite direction (i.e., to lock the lock 720) reduces the force on each pawl 712, thereby returning the pawls to the previous position in which the opposite ends are resiliently biased in a radially outward direction. As discussed below, the position of the pawls 712 determines whether the dial 702 is locked in place or whether the dial may be rotated to move the locking ring 410 between the locked and unlocked configurations. It should be understood that other suitable locking mechanisms may be utilized to lock the dial 702 in place so that the dial does not rotate.

FIG. 5 shows components of the actuator assembly 500, which includes a housing 502. FIG. 6 shows a perspective view of the housing 502 from the opposite side as shown in FIG. 5. FIG. 5 also illustrates the cap assembly 700 and locking ring assembly 400 both in an assembled state. To install the locking hub system 300, the actuator assembly 500 is assembled and fastened to the hub assembly 200. To assemble the actuator assembly 500, the cap assembly 700, including the dial 702, is secured to the housing 502. The actuating extension 706 is inserted into an outward facing opening in the housing 502 by aligning the pins 708 with corresponding grooves 510A, 510B, and 510C spaced around the housing opening. The actuating extension 706 is inserted into the housing 502 while the dial 702 remains on the exterior of the housing 502, as shown in FIG. 3. As best seen in FIG. 6, the interior of the housing 502 has a larger diameter than the opening through which the actuating extension 706 is inserted so that the actuating extension 706 and pins 708 may rotate within the housing when the dial 702 is rotated. The cap assembly 700 may be secured to the housing 502 with a retaining clip 504. A compression spring 506 is disposed within the housing 502 between the dial 702 and the locking ring 410. When assembled, the spring 506 contacts an inner facing surface 516 in the interior of the housing 502, as shown in FIG. 6, and also contacts an outward facing surface 415 of the locking ring 410. Thus, the locking ring 410 is biased in an inward axial direction 255 by the spring 506.

To complete the actuator assembly 500, the locking ring assembly 400 is inserted into the housing 502 so that the pins 708 of the cap assembly 700 are aligned with corresponding openings 422 on the cam 420, as best seen in FIG. 4. The locking ring assembly 400 is inserted until the pins 708 pass through the cam openings 422, and the assembly 400 is then rotated until the pins 708 engage with corresponding ramped surfaces 424 of the cam 420. The pins 708 engagement with the ramped surfaces 424 of the cam 420, along with the retaining clip 504, keep the cap assembly 700 secured to the housing 502. When fully assembled, the ramped surfaces 424 engage with the pins 708 to translate rotational movement of the dial 702 into axial movement of the locking ring 410. The force of the spring 506 pushes the locking ring 410 in an inward axial direction 255 so that the pins 708 remain engaged with the ramped surfaces 424.

Thus, from the perspective shown in FIG. 5, when the dial 702 is rotated in a clockwise direction, the pins 708 also move in a clockwise direction while engaged with the ramped surfaces 424 of the cam 420, which does not rotate. The pins 708 move along each of the ramped surfaces 424, and this motion allows the locking ring 410 to move axially in an inward direction 255 due to the force of the spring 506 biasing the locking ring 410 inwardly. The inward axial motion of the locking ring 410, which moves the locking ring into the locked configuration, causes the splines 412 of the locking ring to mate with the splines 204 of the axle 202, which locks the hub 212 in a rotationally fixed position relative to the axle 202. When the dial 702 is rotated in a counterclockwise direction, the pins 708 move in a counterclockwise direction while engaged with the ramped surfaces 424 of the cam 420, thereby forcing the locking ring 410 to move axially in an outward direction 260 against the force of the spring 506. The outward axial motion of the locking ring 410, which moves the locking ring into the unlocked configuration, causes the splines 412 of the locking ring to then decouple from the splines 204 of the axle 202, which allows the hub 212 to freely rotate about the axle 202. FIG. 10 illustrates the locking ring 410 mated with the axle 202 in the locked configuration, and FIG. 11 illustrates the locking ring 410 decoupled from the axle 202 in the unlocked configuration.

To complete installation of the system 300, bolts 302 may be utilized to fasten the actuator assembly 500 to the hub assembly 200, as shown in FIG. 3. The dial 702 has a plurality of spaced indentations 704 that each correspond to a respective bolt opening 508 in the housing 502, as shown in FIG. 5. In a preferred embodiment, an interior wall of the housing 502 has a plurality of grooves 514 adjacent to and aligned with each of the bolt openings 508, respectively, as best seen in FIG. 6. To assemble the system 300, the indentations 704 on the dial, the bolt openings 508 and grooves 514 in the housing 502, and the grooves 414 of the locking ring 410 are all aligned with bolt holes 216 in the hub 212. The bolts 302 may then be inserted through the indentations 704 on the dial, the bolt openings 508 and grooves 514 in the housing 502, and the grooves 414 of the locking ring 410 and threaded into the bolt holes 216 in the hub 212 to fasten the actuator assembly 500 to the hub 212. The locking ring 410 has a slightly smaller diameter than the interior of the housing 502 so that each groove 514 in the housing 502 and each corresponding groove 414 in the locking ring 410 forms a generally circular opening that surrounds the shank of each bolt 302 when the locking ring 410 is positioned within the housing 502. Thus, when assembled, each bolt 302 is positioned within one of the grooves 414 in the locking ring 410, which prevents the locking ring 410 from rotating inside the housing 502. Thus, when the dial 702 is rotated, the locking ring 410 can move only in an axial direction 255 or 260 between the locked and unlocked configurations and cannot rotate.

In a preferred embodiment, when the indentations 704 on the dial 702 are aligned with the bolt openings 508 and grooves 514 in the housing 502, the grooves 414 of the locking ring 410, and the bolt holes 216 in the hub 212, the cam 420 and locking ring 410 are in the unlocked configuration. Thus, when the bolts 302 are inserted through the indentations 704 on the dial 702 and threaded into the holes 216 hub 212 to complete assembly of the locking hub system 300, the system is initially in the unlocked configuration. In the unlocked configuration, the heads of each bolt 302 are accessible through the indentations 704 on the dial 702, as shown in FIG. 12. The dial 702 may then be rotated to actuate the locking ring 410 to move inward to mate with the axle 202 in order to move the locking ring into the locked configuration. As shown in FIG. 13, the dial 702 is configured to cover a head of each bolt 302 when the locking ring 410 is in the locked configuration. Thus, the system 300 must be in the unlocked configuration to access the bolts 302 to disassemble the system. This feature prevents removal of the bolts 302 by an unauthorized individual for the purpose of disassembling the system to circumvent the security lock 720. In a preferred embodiment, the bolts 302 each have a tamper-proof head for additional security. Thus, the head of each bolt 302 may have a non-standard engagement surface so that the bolts cannot be removed using standard commercially available tools such as a standard wrench, a socket wrench, a screwdriver, or a hex key. A specially adapted tool may be provided with the system 300 for engaging the bolt 302 heads for authorized assembly and disassembly of the system 300.

The security lock 720 is configured to selectively limit rotational movement of the dial 702. When the locking hub system is in the locked configuration so that the hub 212 is rotationally locked in place relative to the axle 202, the security lock 720 may be used to lock the dial 702 in place so that an unauthorized individual cannot rotate the dial 702 to move the locking ring 410 into the unlocked configuration. Optionally, the dial 702 may also be locked in place when the system is in the unlocked configuration, as shown in FIG. 12. The grooves 510A, 510B, and 510C spaced around the housing opening, as shown in FIG. 5, provide space through which the pins 708 may be inserted when securing the cap assembly 700 to the housing 502. Grooves 510A and 510B additionally function as slots for the locking pawls 712, in addition to grooves 512A and 512B. When the dial 702 is unlocked (i.e., the dial may be rotated), the locking pawls 712 are positioned within the lock pawl openings 710 in the dial 702 and do not extend radially outward from the openings 710. A unique key configured to operate the lock 720 may be used to initiate rotation of the lock cam 722 to pivot the two opposing pawls 712 so that one end of each pawl moves radially outward and into one of a pair of grooves, which may be either grooves 510A and 512A or grooves 510B and 512B, depending on the position of the dial 702. When the pawls 712 are positioned in grooves 510A and 512A or in grooves 510B and 512B, the dial 702 is locked in place and cannot be rotated. When the pawls 712 are retracted back into the lock pawl openings 710, the dial 702 may be rotated to actuate the locking ring 410.

For instance, the dial 702 may be rotated counterclockwise to move the locking ring 410 into the unlocked configuration, in which the locking ring assembly 400 is pulled in an outward direction 260 by the dial pins 708 against the force of the spring 506, and in this configuration the opposing pawls 712 may be positioned adjacent to grooves 510B and 512B. Counterclockwise rotation of the dial 702 may be limited by the size of the cam 420 due to the cam contacting an inner facing surface 516 in the interior of the housing 502 or by another suitable means of limitation. A key to the lock 720 may then be used to initiate rotation of the lock cam 722 to move the lock pawls 712 into grooves 510B and 512B of the housing 502. This action of the pawls 712 locks the dial 702 in place relative to the housing 502 such that the dial cannot be rotated to actuate the locking ring 410 until it is unlocked using the key. Once unlocked by the key, the dial 702 may then be rotated within the housing 502 in a clockwise direction to move the locking ring 410 into the locked configuration, in which the locking ring 410 mates with the axle 202. In this configuration, the opposing pawls 712 may now be positioned adjacent to grooves 510A and 512A. The key may then be used to activate the lock 720 to move the lock pawls 712 into grooves 510A and 512A. The dial 702 is then locked in place such that it cannot be rotated, and the locking ring 410 is in the locked configuration with the dial 702 covering the bolt 302 heads, as shown in FIG. 13. In this configuration, the locking hub system 300 is secure, and the vehicle on which the system is installed cannot be moved by any unauthorized person not in possession of a key to the lock. Thus, in a preferred embodiment, the dial 702 may be locked whether the locking ring 410 is in the locked or the unlocked configuration.

Figure 9:
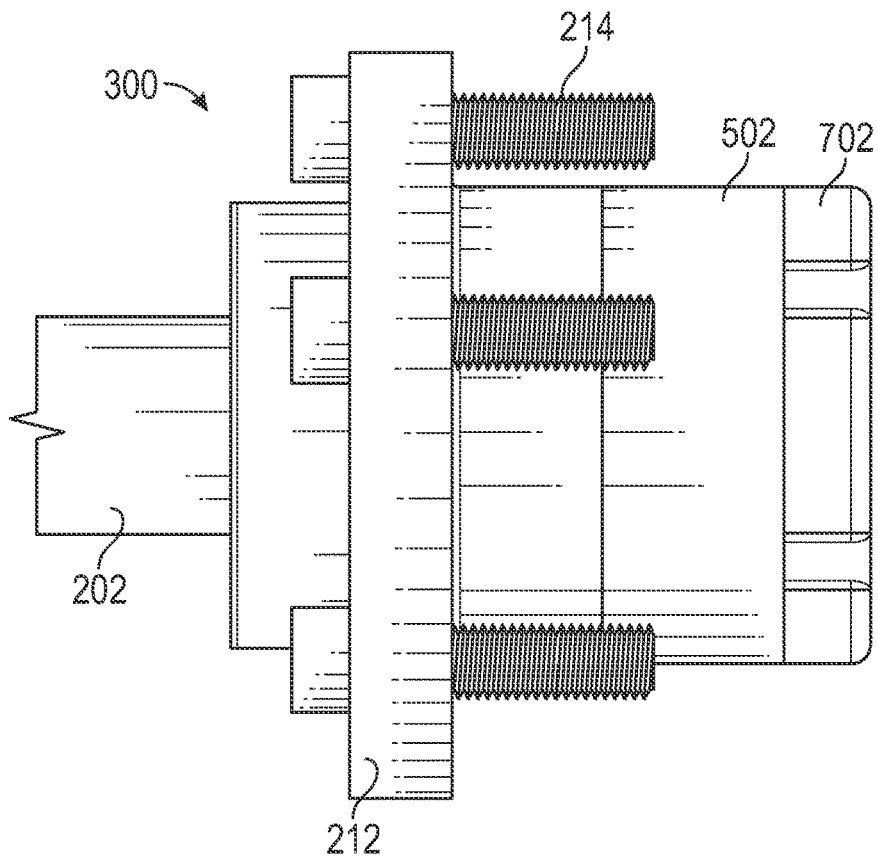
FIG. 9 shows a side elevational view of an assembled locking hub system in accordance with the present disclosure.

FIG. 8 shows a wheel 110 mounted on an assembled locking hub system 300 by fastening the wheel 110 to bolts 214 extending in an outward direction from the hub 212. The security lock 720 is accessible from the exterior of the dial 702 and thus from the exterior of the vehicle 100 for the purpose of locking and unlocking the hub 212, as needed for security. FIG. 9 illustrates a side view of an assembled locking hub system 300 mounted on an axle 202 of a vehicle 100.

FIG. 10 illustrates a cross-sectional view of the assembled locking hub system 300 mounted on an axle 202 as shown in FIG. 9. The system shown in FIG. 10 is in the locked configuration in which the locking ring 410 is mated with the axle 202. In addition, the lock 720 is unlocked such that the dial 702 may be rotated to actuate the locking ring 410, as indicated by the position of the lock pawls 712. In FIG. 11, the dial 702 has been rotated to move the locking ring 410 into the unlocked configuration in which the locking ring 410 is decoupled from the axle 202. When the dial 702 is rotated, the entire cap assembly 700 rotates, including the lock pawls 712. In FIG. 11, the cross-sectional plane is rotated from the plane as shown in FIG. 10 to remain in the same plane as the rotated lock pawls in order to illustrate the positioning of the pawls 712. As shown in FIG. 11, the lock 720 is locked such that the dial 702 may not rotate, as indicated by the position of the lock pawls 712. Thus, the hub 212 shown in FIG. 11 may freely rotate on bearings 208 and 220.

In an alternative embodiment, the system may have a locking security cover that completely covers the dial 702 or other type of actuator such that the locking ring 410 may not be actuated by an unauthorized user. In this embodiment, the security lock may be configured to selectively limit rotational movement of the dial by locking the security cover in a position in which the cover prevents operation of the dial.

It will be appreciated that the configurations and methods shown and described herein are illustrative only, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein. It is understood that versions of the invention may come in different forms and embodiments. Additionally, it is understood that one of skill in the art would appreciate these various forms and embodiments as falling within the scope of the invention as disclosed herein.

What is claimed is:

1. A locking hub system comprising:
    a hub coupled to an axle, wherein the axle has a splined section and has a threaded section having helical threads;
    a threaded fastener having helical threads that are compatible with the threads on the axle;
    a locking ring configured to mate with the splined section of the axle in a locked configuration and to decouple from the splined section of the axle in an unlocked configuration, wherein the hub is rotationally fixed relative to the axle in the locked configuration and free to rotate about the axle in the unlocked configuration; and
    an actuator operably connected to the locking ring and configured to move the locking ring in an axial direction between the locked configuration and the unlocked configuration.

2. The locking hub system of claim 1, wherein the actuator is a mechanical actuator comprising a dial operably connected to the locking ring and configured to move the locking ring in an axial direction between the locked configuration and the unlocked configuration in response to rotational movement of the dial.

3. The locking hub system of claim 2, wherein the dial is secured to a housing that is fastened to the hub with bolts, wherein the dial is configured to cover a head of each bolt when the locking ring is in the locked configuration.

4. The locking hub system of claim 3, wherein each bolt has a tamper-proof head.

5. The locking hub system of claim 2, wherein the dial is secured to a housing that is fastened to the hub with bolts, wherein the locking ring has grooves positioned around an outer edge of the locking ring, wherein each respective one of the bolts is positioned within a respective one of the grooves in the locking ring, wherein the bolts are configured to prevent rotational movement of the locking ring relative to the housing while allowing axial movement of the locking ring between the locked configuration and the unlocked configuration.

6. The locking hub system of claim 2, wherein the dial is operably connected to the locking ring by a cam that moves in an axial direction between the locked configuration and the unlocked configuration in response to rotational movement of the dial.

7. The locking hub system of claim 2, wherein the locking ring is biased in an inward axial direction by a compression spring disposed between the dial and the locking ring.

8. The locking hub system of claim 1, wherein the locking ring has an interior splined surface, and the splined section of the axle has an exterior splined surface positioned around a circumference of the axle and configured to mate with the interior splined surface of the locking ring.

9. The locking hub system of claim 1, wherein the axle is mounted in a rotationally fixed position.

10. The locking hub system of claim 1, wherein the system is designed to prevent rotational movement of the locking ring relative to the hub while allowing axial movement of the locking ring between the locked configuration and the unlocked configuration.

11. A conveyance vehicle having at least one wheel mounted on a locking hub system comprising:
    a hub coupled to an axle, wherein the axle has a splined section and has a threaded section having helical threads;
    a threaded fastener having helical threads that are compatible with the threads on the axle;
    a locking ring configured to mate with the splined section of the axle in a locked configuration and to decouple from the splined section of the axle in an unlocked configuration, wherein the hub is rotationally fixed relative to the axle in the locked configuration and free to rotate about the axle in the unlocked configuration; and
    an actuator operably connected to the locking ring and configured to move the locking ring in an axial direction between the locked configuration and the unlocked configuration.

12. The conveyance vehicle of claim 11, wherein the actuator is a mechanical actuator comprising a dial operably connected to the locking ring and configured to move the locking ring in an axial direction between the locked configuration and the unlocked configuration in response to rotational movement of the dial.

13. The conveyance vehicle of claim 12, wherein the dial is secured to a housing that is fastened to the hub with bolts, wherein the dial is configured to cover a head of each bolt when the locking ring is in the locked configuration.

14. The conveyance vehicle of claim 13, wherein each bolt has a tamper-proof head.

15. The conveyance vehicle of claim 12, wherein the dial is secured to a housing that is fastened to the hub with bolts, wherein the locking ring has grooves positioned around an outer edge of the locking ring, wherein each respective one of the bolts is positioned within a respective one of the grooves in the locking ring, wherein the bolts are configured to prevent rotational movement of the locking ring relative to the housing while allowing axial movement of the locking ring between the locked configuration and the unlocked configuration.

16. The conveyance vehicle of claim 12, wherein the dial is operably connected to the locking ring by a cam that moves in an axial direction between the locked configuration and the unlocked configuration in response to rotational movement of the dial.

17. The conveyance vehicle of claim 12, wherein the locking ring is biased in an inward axial direction by a compression spring disposed between the dial and the locking ring.

18. The conveyance vehicle of claim 11, wherein the locking ring has an interior splined surface, and the splined section of the axle has an exterior splined surface positioned around a circumference of the axle and configured to mate with the interior splined surface of the locking ring.

19. The conveyance vehicle of claim 11, wherein the axle is mounted in a rotationally fixed position.

20. The conveyance vehicle of claim 11, wherein the system is designed to prevent rotational movement of the locking ring relative to the hub while allowing axial movement of the locking ring between the locked configuration and the unlocked configuration.

\* \* \* \* \*